United States Patent
Moore (10) Patent No.: US 8,902,697 B2
(45) Date of Patent: *Dec. 2, 2014

(54) REMOVING SEISMIC INTERFERENCE USING SIMULTANEOUS OR NEAR SIMULTANEOUS SOURCE SEPARATION

(75) Inventor: Ian Moore, Highfields Caldecote (GB)

(73) Assignee: WesternGeco L.L.C., Sugar Land, TX (US)

( * ) Notice: Subject to any disclaimer, the term of this patent is extended or adjusted under 35 U.S.C. 154(b) by 1402 days.

This patent is subject to a terminal disclaimer.

(21) Appl. No.: 12/256,135

(22) Filed: Oct. 22, 2008

(65) Prior Publication Data

US 2010/0097885 A1  Apr. 22, 2010

(51) Int. Cl.
- *G01V 1/38* (2006.01)
- *G01V 1/28* (2006.01)
- *G01V 1/36* (2006.01)

(52) U.S. Cl.
CPC ............ *G01V 1/366* (2013.01); *G01V 2210/32* (2013.01)
USPC ............................................... 367/21; 367/14

(58) Field of Classification Search
CPC .............................. G01V 1/366; G01V 1/3808
USPC ............ 367/19, 38, 43, 50, 53, 74; 702/14, 17
See application file for complete search history.

(56) References Cited

U.S. PATENT DOCUMENTS

| | | | |
|---|---|---|---|
| 4,611,312 A * | 9/1986 | Ikeda | 367/38 |
| 4,953,657 A | 9/1990 | Edington | |
| 5,448,531 A | 9/1995 | Dragoset, Jr. | |
| 5,924,049 A | 7/1999 | Beasley et al. | |
| 6,041,018 A | 3/2000 | Roche | |
| 6,545,944 B2 | 4/2003 | de Kok | |
| 6,882,938 B2 | 4/2005 | Vaage et al. | |
| 6,906,981 B2 | 6/2005 | Vaage | |
| 2004/0049347 A1 | 3/2004 | Fookes et al. | |
| 2005/0128874 A1 | 6/2005 | Herkenhoff | |
| 2007/0091719 A1* | 4/2007 | Falkenberg et al. | 367/19 |

OTHER PUBLICATIONS

Akbulut, et al., Suppression of Seismic Interference Noise on Gulf of Mexico Data, Annual Offshore Technology Conference, May 1, 1985, pp. 303-308, vol. 2.
Brittan, et al., Optimizing the Removal of Seismic Interference Noise, The Leading Edge, Feb. 2008, pp. 166-173.
Kommedal, et al., A Case of SI Attenuation in 4D Seismic Data Recorded with Permanently Installed Array, Geophysics, May-Jun. 2007, pp. Q11-Q14, vol. 72, No. 3.
Rajput, et al., Signal Preserving Seismic Interference Noise Attenuation on 3D Marine Seismic Data, SEG /New Orleans 2006 Annual Meeting, pp. 2747-2751.

(Continued)

*Primary Examiner* — Daniel L Murphy (57) ABSTRACT

A technique includes providing seismic data that is indicative of energy that is sensed in response to a first operation of at least one seismic source in a first seismic survey and a second operation of at least one seismic source in a second seismic survey. The technique includes processing the seismic data to determine a timing of the second operation relative to the first operation, and the technique includes based at least in part of the determined timing, processing the seismic data to generate a dataset, which is indicative of the sensed energy that is attributable to the first operation and is not attributable to the second operation.

23 Claims, 6 Drawing Sheets

(56) References Cited

OTHER PUBLICATIONS

European Search Report, dated Mar. 2, 2010, Application No. 09173625.6.
Beasley, et al, A New Look at Simultaneous Sources, 1998 SEG Expanded Abstracts, 1998.
Manin, et al., Industrial and Seismic Noise Removal in Marine Processing, EAEG 55th Meeting and Technical Meeting, 1993.
Lynn, Experimental Investigation of Interference from Other Seismic Crews, Geophysics, Nov. 1987, p. 1501-1524.
Jan H. Kommedal et al., "A Case of SI Attenuation in 4D Seismic Data Recorded With a Permanently Installed Array," Geophysics, 2007, vol. 72: pp. Q11-Q14.
Examination Report of Mexican Serial No. MX/a/2009/011423 dated Aug. 10, 2011.

* cited by examiner

REMOVING SEISMIC INTERFERENCE USING SIMULTANEOUS OR NEAR SIMULTANEOUS SOURCE SEPARATION

BACKGROUND

The invention generally relates to removing seismic interference using simultaneous or near simultaneous source separation.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes providing seismic data that is indicative of energy that is sensed in response to a first operation of at least one seismic source in a first seismic survey and a second operation of at least one seismic source in a second seismic survey. The technique includes processing the seismic data to determine a timing of the second operation relative to the first operation, and the technique includes based at least in part on the determined timing, processing the seismic data to generate a dataset, which is indicative of the sensed energy that is attributable to the first operation and is not attributable to the second operation.

In an embodiment of the invention, a technique includes providing seismic data that is indicative of a signal that is sensed in response to operation of at least one seismic source in a seismic survey and noise that is incoherent in a domain in which the signal is coherent. The technique includes processing the seismic data to determine a timing of the noise relative to the signal. The technique includes based at least in part on the determined timing, processing the seismic data to filter out the noise.

In another embodiment of the invention, a system includes an interface to receive seismic data indicative of energy that is sensed in response to a first operation of at least one seismic source in a first seismic survey and a second operation of at least one seismic source in a second seismic survey. The system includes a processor to process the seismic data to determine a timing of the second operation relative to the first operation. The processor, based at least in part on the determined timing, processes the seismic data to generate a dataset, which is indicative of the sensed energy attributable to the first operation and is not attributable to the second operation.

In yet another embodiment of the invention, a system includes an interface to receive seismic data, which is indicative of a signal that is sensed in response to operation of at least one seismic source in a seismic survey and noise that is incoherent in a domain in which the signal is coherent. The system includes a processor to process the seismic data to determine a timing of the noise relative to the signal, and based at least in part on the determined timing, process the seismic data to filter out the noise.

Advantages and other features of the invention will become apparent from the following drawing, description and claims.

DETAILED DESCRIPTION

Figure 1:
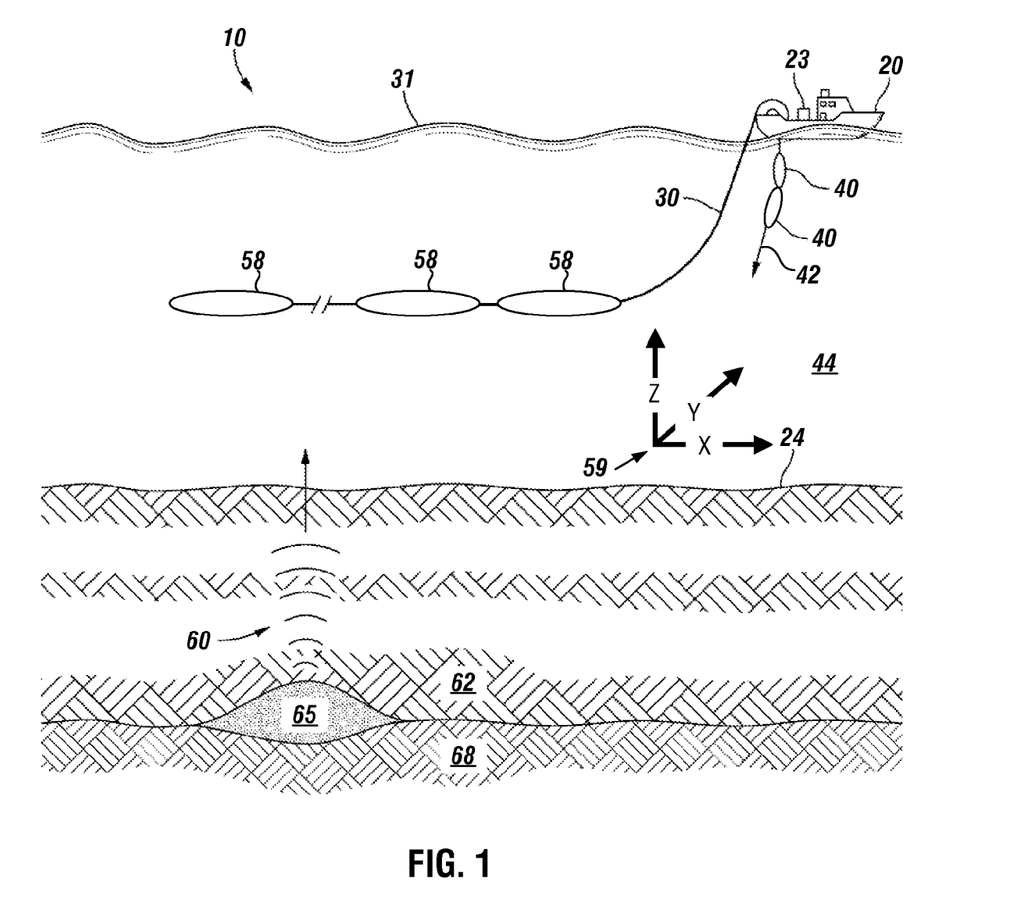
FIG. 1 is a schematic diagram of a marine seismic data acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensors 58, which may be, depending on the particular embodiment of the invention, hydrophones (as one non-limiting example) to acquire pressure data or multi-component sensors. For embodiments of the invention in which the sensors 58 are multi-component sensors (as another non-limiting example), each sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device (as depicted in F*ig*. 1) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the partial derivative of the pressure data with respect to the inline direction.

The marine seismic data acquisition system 10 includes seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor 58 may provide a trace, which corresponds to a measure of a pressure wavefield by its hydrophone 55; and the sensor 58 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system that may be, for example, located on land or on the vessel 20. Thus, many variations are possible and are within the scope of the appended claims.

A particular seismic source 40 may be formed from an array of seismic source elements (such as air guns, for example) that may be arranged in strings (gun strings, for example) of the array. Alternatively, a particular seismic source 40 may be formed from one or a predetermined number of air guns of an array, may be formed from multiple arrays, etc. Regardless of the particular composition of the seismic sources, the sources may be fired in a particular time sequence during the survey.

The measurements that are acquired in the seismic survey quite often contain noise from an interfering source, such as noise that is attributed to the firing of a seismic source in a nearby seismic survey. More specifically, it is not uncommon for multiple nearby seismic surveys to be conducted simultaneously by one or more contractor. If the surveys are sufficiently close together, then the energy that is produced by the seismic sources of one survey is recorded by the seismic sensors of another survey. This energy that propagates between surveys is generally considered to be unwanted interference noise.

Although acquisition crews are often required to time share, such that only one crew is active at a given time in a given area, time sharing may not be required in some areas or even if used may not be entirely effective in eliminating interference noise.

In accordance with embodiments of the invention, which are described herein, seismic data is processed to remove the above-described interference noise in order to reduce artifacts in the processed data and to enable increased acquisition efficiency through reduced time-sharing.

Figure 2:
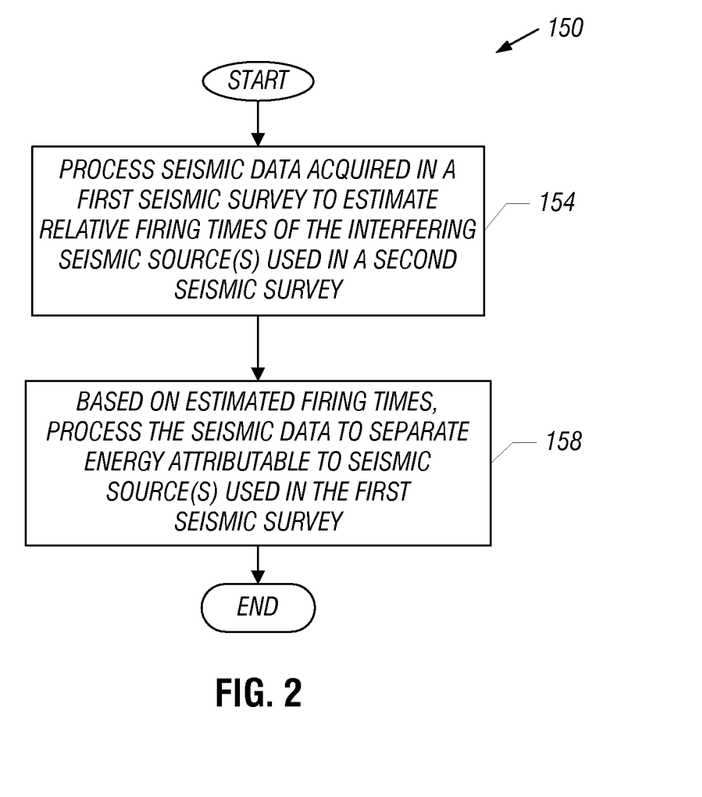
FIG. 2 is a flow diagram depicting a technique to remove noise produced by a first seismic survey from seismic data acquired in another seismic survey.

For the scenario in which the interference noise that is sensed in a subject survey originates with the firing of one or more seismic sources in connection with another survey, a technique 150 that is depicted in FIG. 2 may be used to suppress, or attenuate, the noise. In general, the technique 150 involves processing first seismic data that was acquired in a first survey for purposes of suppressing noise that was introduced into the first seismic data due to energy that was generated by one or more seismic sources that are associated with a second seismic survey. More particularly, the technique 150 includes processing (block 154) the first seismic data acquired in the first seismic survey to estimate the firing times of the interfering seismic source(s) in the second seismic survey relative to the firing times of the seismic sources of the first seismic survey. The determination of the relative firing time relationship allows the seismic source(s) of the second seismic survey to be treated in subsequent processing as interfering seismic sources of the first seismic survey.

More specifically, a given seismic survey may contain multiple seismic sources whose firings, or shots, are closely spaced together for purposes of increasing the survey efficiency. By treating the seismic source(s) of the nearby interfering survey as interfering seismic sources of the subject survey, a source separation algorithm that is designed to separate energy from interfering seismic sources of the same seismic survey may then be applied, such as the algorithm that is described in U.S. patent application Ser. No. 11/964,402, entitled "SEPARATING SEISMIC SIGNALS PRODUCED BY INTERFERING SEISMIC SOURCES," which was filed on Dec. 26, 2007, which is hereby by incorporated by reference in its entirety.

Thus, pursuant to the technique 150, based on the estimated firing time relationship between the seismic sources of the two surveys, the first seismic data is processed, pursuant to block 158, to separate the energy that is attributable to the seismic source(s) of the first seismic survey from the energy (i.e., the "noise") that is attributable to the seismic source(s) of the second seismic survey.

In accordance with some embodiments of the invention, one technique to determine the relative firing times is to cross correlate corresponding traces for sequential firings, or shots. For example, if the main seismic source of the subject survey fires about every ten seconds and an interfering seismic source of the interfering survey fires about every 10.5 seconds, then the interference noise is delayed by about 0.5 seconds from shot to shot. One way to determine the delays is select the peaks of the cross correlation. The peaks may be easily discernible except when the noise falls in an inter-record gap. Typically, the delays do not vary much with offset, and so that the peaks may be enhanced by stacking the correlations over the offset. The peaks may also be enhanced by pre-filtering the acquired seismic data in order to enhance the interference. As an example, a simple, shot domain dip filter that preserves the apparent velocity range of the interference may be used.

Figure 3:
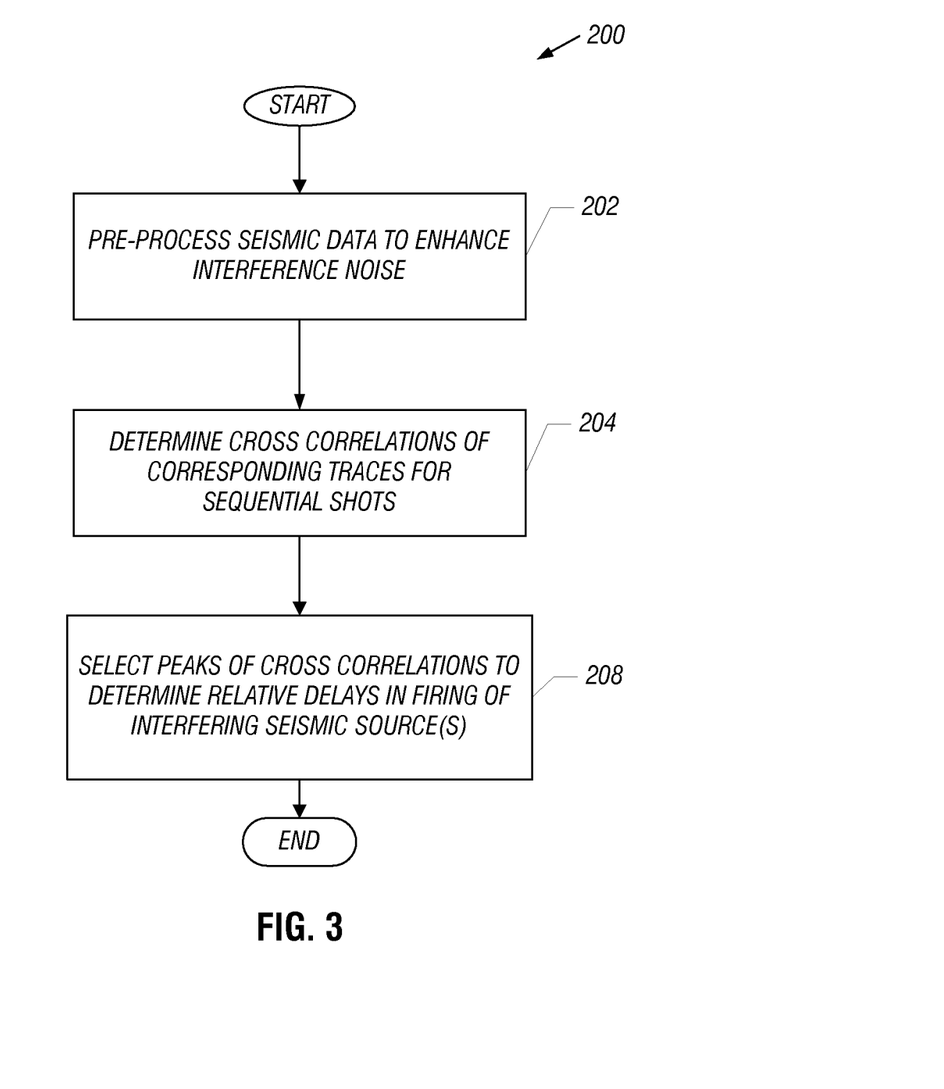
FIG. 3 is a flow diagram depicting a technique to determine a timing relationship between shots of a first seismic survey and shots of a second seismic survey.

Thus, referring to FIG. 3, in accordance with some embodiments of the invention, a technique 200 may be used to determine a timing relationship between the firing of one or more seismic sources of an interfering survey and the firing of one or more seismic sources of the subject survey. Pursuant to the technique 200, the seismic data may first be pre-processed (block 202) to enhance the interference noise. The cross correlations of corresponding traces for sequential shots are determined, pursuant to block 204. The peaks of the cross correlations are then selected (block 208) to determine the delays in firings of the interfering seismic source(s).

In general, it is expected that the delays are naturally sufficiently incoherent to enable the separation process. If, however, this is not the case, then the current seismic survey may be modified by incorporating incoherent delays into the firing times. One advantage of this approach is that the introduced delays are known to the operator of the subject survey, but the introduced delays are unknown to the acquisition company that is conducting the other survey.

Figure 4:
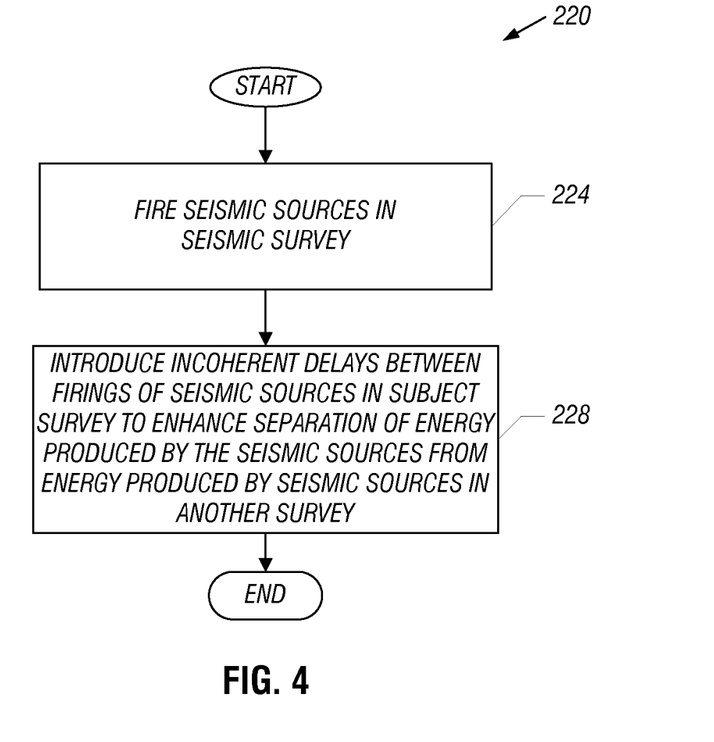
FIG. 4 is a flow diagram depicting a technique to alter the timing of a seismic survey for purposes of enhancing the removal of noise from seismic data acquired in the survey according to an embodiment of the invention.

Thus, referring to FIG. 4, a technique 220 that may be used in connection with some embodiments of the invention includes firing (block 224) seismic sources in a seismic survey and introducing (block 228) incoherent delays between the firings of the seismic sources to enhance the separation of energy produced by seismic sources from interfering energy or noise that is produced by seismic sources in another survey.

It is noted that the techniques that are described herein may be extended readily to more than one source of interference, provided that the delays may be determined separately. Thus, as examples, another seismic source of the interfering survey or the seismic source of yet a third seismic survey may produce interfering noise, which may be removed by the techniques that are disclosed herein. If the sources are spatially separated, then the delays may be determined separately through the use of different dip filters in the pre-processing or through amplitude considerations.

The noise removal techniques that are described herein may be generalized for purposes of removing interference, or noise, that is produced by sources other than seismic sources. In this manner, the techniques that are described herein may be used, in general, to remove noise that is incoherent in some domain where the acquired seismic data is coherent. The noise may be made coherent in the processing to remove the noise by the application of known delays. The noise does not need to be present on every trace.

Figure 5:
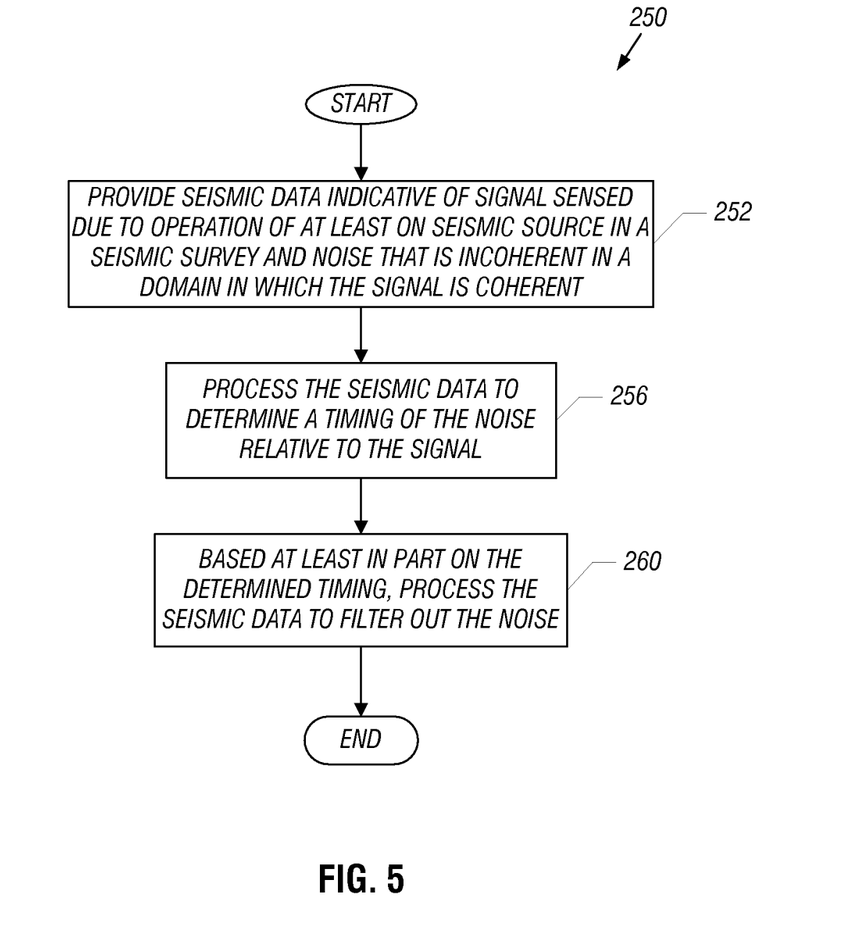
FIG. 5 is a flow diagram depicting a technique to remove noise from acquired seismic data according to an embodiment of the invention.

Thus, referring to FIG. 5, in accordance with embodiments of the invention, a technique 250 may be used, in general, to remove interfering noise. The technique 250 including providing (block 252) seismic data, which is indicative of a signal sensed due to operation of at least one seismic source in a seismic survey and is also indicative of noise that is incoherent in a domain in which the signal is coherent. The technique 250 includes processing (block 256) the seismic data to determine a timing relationship of the noise relative to the signal. The technique 250 further includes, pursuant to block, 260, processing the seismic data to filter the noise from the signal based at least in part on the determined timing relationship.

As discussed above, after the relative timing relationship between the interfering noise source(s) and the firing of the seismic source(s) of the subject survey is determined, the noise source(s) may be treated as an interfering source of the subject survey. One exemplary source separation technique that may then be applied is described below.

The seismic data (referred to herein as a "seismic data vector d") is deemed to be acquired by seismic sensors due to the firings of N (i.e., multiple) seismic sources, which include the seismic source(s) of the subject survey as well as the seismic source(s) of the interfering seismic survey(s). The simultaneous or near simultaneous firing of the seismic sources causes significant energy from all of these firings to be present in the seismic data vector d. Models, which describe the geology that affects the source energy are associated with linear operators that describe the physics of the source mechanisms, the wave propagation and the survey geometry. The seismic data vector d may then be characterized as a function of the models and the linear operators. Thus, in theory, the function may be jointly inverted for the models, which permits the seismic data vector d to be separated into N seismic datasets $d_1, d_2, d_3 \ldots d_N$ such that each dataset is uniquely attributable to one of the seismic sources. In other words, each dataset represents a component of the sensed composite energy signal, which is uniquely attributable to one of the seismic sources.

As a more specific example, assume that the seismic data vector d is acquired due to the near simultaneous firing of two seismic sources called "$S_1$" and "$S_2$." For this example, the seismic sources $S_1$ and $S_2$ are fired pursuant to a timing sequence, which may be based on a predetermined timing pattern or may be based on random or pseudo-random times. Regardless of the particular timing scheme, it is assumed for this example that the seismic source $S_1$ is fired before the seismic source $S_2$ for all traces, and it is further assumed that the zero times of the traces correspond to the firing times for $S_1$. Thus, the zero times of the traces are in "$S_1$ time." The offsets, or vectors, to the seismic sources $S_1$ and $S_2$ are called "$x^1$" and "$x^2$," respectively. The timing delays, denoted by "t" for the seismic source $S_2$ are known for each trace.

It is assumed for this example that the collection of traces are such that the values of t are random. In practice, this is the case for a CMP, receiver or common offset gather. For purposes of simplifying this discussion, it is assumed that the trace in each gather may be located with respect to the seismic source $S_1$ and seismic source $S_2$ using scalar quantities called "$x^1_i$" and "$x^2_i$," respectively. In this notation, the subscript "i" denotes the trace number in the gather. As a more specific example, for a CMP gather, "$x^1_i$" may be the scalar offset to the seismic source $S_1$, and these quantities are referred to as offsets below. Similarly, "$t_i$" denotes the timing delay for the $i^{th}$ trace.

The recorded energy for the seismic source $S_1$ may be modeled by applying a linear operator called "$L_1$" (which represents the physics of the seismic source $S_1$, the wave propagation associated with the source $S_1$ and the survey geometry associated with the seismic source $S_1$) to an unknown model called "$m_1$," which describes the geology that affects the energy that propagates from the seismic source $S_1$. The model $m_1$ contains one element for each parameter in the model space. Typically the model space may be parameterized by slowness or its square, corresponding to linear or hyperbolic/parabolic Radon transforms, respectively. The linear operator $L_1$ is a function of the offsets to the source $S_1$, the parameters that characterize the model space, and time or frequency. A seismic data vector $d_1$ contains one element for each trace (at each time or frequency) and is the component of the seismic data d, which is associated with the seismic source $S_1$. In other words, the seismic data vector $d_1$ represents the dataset attributable to the seismic source $S_1$. The seismic data vector $d_1$ may be described as follows:

$$d_1 = L_1 m_1. \qquad \text{Eq. 1}$$

The energy that is associated with the seismic source $S_2$ appears incoherent in the seismic data vector d. However, the energy is related to a coherent dataset in which the firing times for the seismic source $S_2$ are at time zero (i.e., seismic source $S_2$ time) by the application of time shifts $t_i$ to the traces. A diagonal linear operator called "$D_2$" may be used for purposes of describing these time shifts, such that the component of the seismic data vector d, which is associated with the seismic source $S_2$ and which is called "$d_2$" may be described as follows:

$$d_2 = D_2 L_2 m_2. \qquad \text{Eq. 2}$$

In Eq. 2, a linear operator called "$L_2$" represents the physics of the seismic source $S_2$, the wave propagation associated with the seismic source $S_2$ and the survey geometry associated with the seismic source $S_2$. Also in Eq. 2, a model called "$m_2$" describes the geology that affects the energy that propagates from the seismic source $S_2$.

The composite seismic energy signal that is recorded by the seismic sensors is attributable to both seismic sources $S_1$ and $S_2$. Thus, the seismic data vector d (i.e., the recorded data) is a combination of the seismic data vectors $d_1$ and $d_2$, as described below:

$$d = d_1 + d_2. \qquad \text{Eq. 3}$$

Due to the relationships in Eqs. 1, 2 and 3, the seismic data vector d may be represented as the following linear system:

$$d = [L_1 \quad D_2 L_2] \begin{bmatrix} m_1 \\ m_2 \end{bmatrix}. \qquad \text{Eq. 4}$$

Thus, Eq. 4 may be solved (i.e., jointly inverted) for the model vector m (i.e., ($m_1$; $m_2$)) using standard techniques, such as the least squares algorithm; and after the model vector m is known, Eqs. 1 and 2 may be applied with the models $m_1$ and $m_2$ for purposes of separating the seismic data vector d into the seismic data vectors $d_1$ and $d_2$, i.e., into the datasets that indicate the measurements attributable to each seismic source.

Eq. 4 may be inverted in the frequency ($\omega$) domain. In that case, $(D_2)_{jk} = \exp(-i\omega t_j)\delta_{jk}$ and $(L_s)_{jk} = \exp(-i\omega t^s_{jk})$, where $t^s_{jk}$ is the time shift associated with offset $x^s_j$ and the parameter for the $k^{th}$ trace in the model space associated with $S_s$. For a linear Radon transform parameterized by slowness, $p^s_k$, $t^s_{jk} = x^s_j p^s_k$. For a parabolic Radon transform parameterized by curvature, $q^s_k$, $t^s_{jk} = (x^s_j)^2 q^s_k$.

The success of the source separation technique described above depends on the ability of the transform to separate the energy associated with the two sources. Unlike most applications of Radon transforms, success does not depend on the ability to focus energy at the correct model parameter within $m_1$ or $m_2$. When random or pseudo time delays are used between source firings, the basis functions for the two model domains ($t^1_{jk}$ and $t_j + t^2_{jk}$) are very different, and this enables extremely effective separation of the sources.

Figure 6:
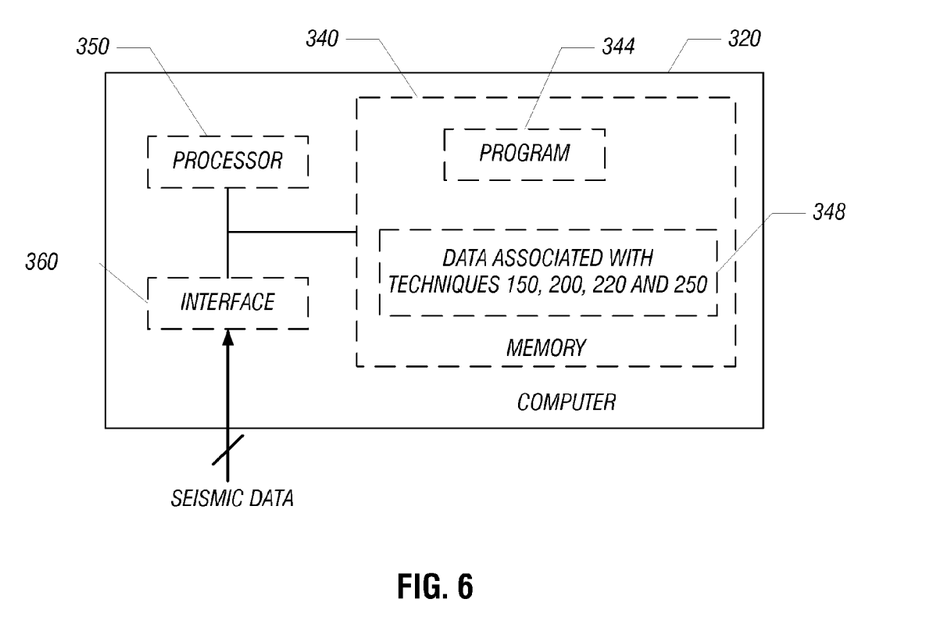
FIG. 6 is a schematic diagram of a processing system according to an embodiment of the invention.

Referring to FIG. 6, in accordance with some embodiments of the invention, a data processing system 320 may perform at least some parts of one or more of the techniques that are disclosed herein for purposes of suppressing noise from one or more interfering sources. In accordance with some embodiments of the invention, the system 320 may include a processor 350, such as one or more microprocessors and/or microcontrollers. The processor 350 may be located on a streamer 30 (FIG. 1), located on the vessel 20 or located at a land-based processing facility (as examples), depending on the particular embodiment of the invention.

The processor 350 may be coupled to a communication interface 360 for purposes of receiving such data as the acquired seismic data. As examples, the communication interface 360 may be a Universal Serial Bus (USB) interface, a network interface, a removable media (such as a flash card, CD-ROM, etc.) interface or a magnetic storage interface (IDE or SCSI interfaces, as examples). Thus, the communication interface 360 may take on numerous forms, depending on the particular embodiment of the invention.

In accordance with some embodiments of the invention, the communication interface 360 may be coupled to a memory 340 of the system 320 and may store, for example, various input and/or output datasets involved in the determination of above-described timing relationships, the determination of the source separation and in general, the application of the noise suppression techniques that are described herein. The memory 340 may store program instructions 344, which when executed by the processor 350, may cause the processor 350 to perform various tasks of one or more of the techniques and systems that are disclosed herein, such as the techniques 150, 200, 220 and/or 250; and the system 320 may display results obtained via the technique(s)/system(s) on a display (not shown in FIG. 6) of the system 320, in accordance with some embodiments of the invention.

Other embodiments are within the scope of the appended claims. For example, although a towed marine-based seismic acquisition system has been described above, the techniques and systems described herein may likewise be applied to other types of seismic acquisition systems. As non-limiting examples, the techniques and system that are described herein may be applied to seabed, borehole and land-based seismic acquisition systems. Thus, the seismic sensors and sources may be stationary or may be towed, depending on the particular embodiment of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
providing seismic data representing energy sensed in response to a first operation of at least one seismic source in a first seismic survey and a second operation of at least one seismic source in a second seismic survey;
associating models with linear operators, the models describing geology associated with the sensed energy;
characterizing the seismic data based at least in part on the models and the associated linear operators;
processing the seismic data to determine a timing of the second operation relative to the first operation; and
performing source separation to attribute a portion of the sensed energy to the first operation based at least in part on the determined timing and the characterization of the seismic data to generate a dataset representing the portion of the sensed energy wherein performing the source separation comprises:
processing the data representing the timing and the characterization of the seismic data in a processor-based machine programmed to determine the models based at least in part on the timing and the characterization of the seismic data; and
determining the dataset based at least in part on the models and the seismic data.

2. The method of claim 1, wherein the act of processing the seismic data to determine the timing comprises:
determining cross correlations of seismic traces recorded during the first operation.

3. The method of claim 2, further comprising:
processing the seismic data to enhance interference noise attributable to the second operation prior to the act of determining the cross correlations.

4. The method of claim 2, wherein the act of processing the seismic data to determine the timing comprises selecting peaks of the cross correlations to determine times at which said at least one seismic source of the second operation was fired relative to the times at which said at least one seismic source of the first operation was fired.

5. The method of claim 1, wherein
a first subset of the energy is attributable to the first operation,
a second subset of the energy is attributable to the second operation, and
the second subset is incoherent in a domain in which the first subset is coherent.

6. The method of claim 5, further comprising:
operating said at least one seismic source in the first seismic survey to cause the second subset to be incoherent in the domain.

7. The method of claim 6, wherein the act of operating said at least one seismic source in the first seismic survey to cause the second subset to be incoherent in the domain comprises introducing delays in firings of said at least one seismic source in the first seismic survey which are incoherent in the domain.

8. A method comprising:
providing seismic data, the seismic data representing a signal sensed in response to operation of at least one seismic source in a seismic survey and the seismic data representing noise that is incoherent in a domain in which the signal is coherent;
associating models with linear operators, the models describing geology associated with the sensed signal;
characterizing the seismic data based at least in part on the models and the associated linear operators;
processing the seismic data to determine a timing of the noise relative to the signal; and
filtering out the noise based at least in part on the determined timing and the characterization of the seismic data to generate second data, wherein filtering out the noise comprises:
processing the data representing the timing and the characterization of the seismic data in a processor-based machine programmed to determine the models based at least in part on the timing and the characterization of the seismic data; and
determining the second data based at least in part on the models and the seismic data.

9. The method of claim 8, wherein the act of processing the seismic data to determine the timing comprises:
determining cross correlations of seismic traces recorded during firings of said at least one seismic source.

10. The method of claim 9, further comprising:
processing the seismic data to enhance interference noise attributable to another seismic survey prior to the act of determining the cross correlations.

11. The method of claim 9, wherein the act of processing the seismic data to determine the timing comprises selecting peaks of the cross correlations.

12. The method of claim 8, wherein the noise is due to another seismic survey that interferes with the at least one seismic source.

13. A system comprising:
an interface to receive seismic data representing energy sensed in response to a first operation of at least one seismic source in a first seismic survey and a second operation of at least one seismic source in a second seismic survey; and
a processor to:
associate models with linear operators, the models describing geology associated with the sensed energy;
characterize the seismic data based at least in part on the models and the associated linear operators;
process the seismic data to determine a timing of the second operation relative to the first operation; and
perform source separation to attribute a portion of the sensed energy to the first operation based at least in part on the determined timing and the characterization of the seismic data to generate a dataset representing the portion of the sensed energy attributable to the first operation, wherein the processor is adapted to:
determine the models based at least in part on the timing and the characterization of the seismic data; and
determine the dataset based at least in part on the models and the seismic data.

14. The system of claim 13, further comprising:
a survey vessel; and
a streamer comprising seismic sensors to acquire the seismic data.

15. The system of claim 13, further comprising:
a streamer,
wherein the processor is located on the streamer.

16. The system of claim 13, wherein the processor determines cross correlations of seismic traces recorded during the first operation.

17. The system of claim 16, wherein the processor further selects peaks of the cross correlations to determine the timing.

18. The system of claim 13, wherein
a first subset of the energy is attributable to the first operation,
a second subset of the energy is attributable to the second operation, and
the second subset is incoherent in a domain in which the first subset is coherent.

19. A system comprising:
an interface to receive seismic data, the seismic data representing a signal sensed in response to operation of at least one seismic source in a seismic survey and the seismic data representing noise that is incoherent in a domain in which the signal is coherent; and
a processor to:
associate models with linear operators, the models describing geology associated with the sensed signal;
characterizing the seismic data based at least in part on the models and the associated linear operators;
process the seismic data to determine a timing of the noise relative to the signal; and filter out the noise based at least in part on the determined timing and the characterization of the seismic data to generate second data, the processor adapted to:
determine the models based at least in part on the timing and the characterization of the seismic data; and
determine the second data based at least in part on the models and the seismic data.

20. The system of claim 19, further comprising:
a survey vessel; and
a streamer comprising seismic sensors to acquire the seismic data.

21. The system of claim 19, further comprising:
a streamer,
wherein the processor is located on the streamer.

22. The system of claim 19, wherein the processor determines cross correlations of seismic traces recorded during firings of said at least one seismic source to determine the timing.

23. The system of claim 19, wherein the noise is attributable to another seismic survey.

* * * * *